US012564952B2

(12) United States Patent
Koyama et al.

(10) Patent No.: US 12,564,952 B2
(45) Date of Patent: Mar. 3, 2026

(54) ROBOT TEACHING DEVICE AND WORK TEACHING METHOD

(71) Applicant: Hitachi High-Tech Corporation, Tokyo (JP)

(72) Inventors: Masahiro Koyama, Tokyo (JP); Shogo Ogawara, Tokyo (JP); Shinichi Ishikawa, Tokyo (JP); Tomohiro Inoue, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 430 days.

(21) Appl. No.: 18/011,982

(22) PCT Filed: Jun. 25, 2020

(86) PCT No.: PCT/JP2020/025077
§ 371 (c)(1),
(2) Date: Dec. 21, 2022

(87) PCT Pub. No.: WO2021/260898
PCT Pub. Date: Dec. 30, 2021

(65) Prior Publication Data
US 2023/0278211 A1 Sep. 7, 2023

(51) Int. Cl.
*B25J 9/16* (2006.01)
*B25J 9/00* (2006.01)
*G05B 19/42* (2006.01)
(52) U.S. Cl.
CPC .......... *B25J 9/1664* (2013.01); *B25J 9/0081* (2013.01); *G05B 19/42* (2013.01);
(Continued)

(58) Field of Classification Search
CPC ....... B25J 9/1664; B25J 9/0081; G05B 19/42; G05B 2219/35444; G05B 2219/36442; G05B 2219/40391
See application file for complete search history.

(56) References Cited

U.S. PATENT DOCUMENTS

2004/0172168 A1    9/2004  Watanabe et al.
2007/0262743 A1*  11/2007  Kono ...................... B25J 19/06
                                                                318/661
(Continued)

FOREIGN PATENT DOCUMENTS

JP          2002-120174 A      4/2002
JP          2011-131326 A      7/2011
(Continued)

OTHER PUBLICATIONS

International Search Report (PCT/ISA/210) issued in PCT Application No. PCT/JP2020/025077 dated Sep. 24, 2020 with English translation (six (6) pages).
(Continued)

*Primary Examiner* — Jay Khandpur

(74) *Attorney, Agent, or Firm* — Crowell & Moring LLP

(57) ABSTRACT

An operation is generated in which a robot can perform work without causing interference with a surrounding structure within a movable range of the robot. The robot teaching device relates to a work teaching device that teaches work to a robot that holds and moves a held object. The device
(Continued)

includes a teaching pose measurement unit configured to measure and/or calculate a teaching pose that is a pose of the held object during teaching work, and a robot operation generation unit configured to generate a joint displacement sequence of the robot such that a pose of a held object of the same type as the held object whose teaching pose is measured becomes the same pose as the teaching pose.

15 Claims, 16 Drawing Sheets

(52) U.S. Cl.
CPC .............. *G05B 2219/35444* (2013.01); *G05B 2219/36442* (2013.01); *G05B 2219/40391* (2013.01)

(56) References Cited

U.S. PATENT DOCUMENTS

| | | | | |
|---|---|---|---|---|
| 2012/0136481 | A1* | 5/2012 | Maisonnier | ............ B25J 9/1671 |
| | | | | 700/257 |
| 2014/0172167 | A1 | 6/2014 | Matsukuma et al. | |
| 2015/0277430 | A1 | 10/2015 | Linnell et al. | |
| 2015/0375391 | A1 | 12/2015 | Maeda | |
| 2017/0120449 | A1* | 5/2017 | Matsunami | ............ B25J 9/1676 |
| 2018/0021956 | A1* | 1/2018 | Atherton | .............. G05D 1/0016 |
| | | | | 700/259 |
| 2018/0117763 | A1 | 5/2018 | Nagasaki et al. | |
| 2018/0281190 | A1 | 10/2018 | Kakisaka et al. | |
| 2018/0345491 | A1 | 12/2018 | Iwamoto | |
| 2019/0321983 | A1* | 10/2019 | Chen | ...................... B25J 9/1633 |
| 2019/0329404 | A1* | 10/2019 | Takeuchi | ............. G05B 19/425 |
| 2022/0105640 | A1* | 4/2022 | Noren | ................... B25J 9/1653 |

FOREIGN PATENT DOCUMENTS

| | | | |
|---|---|---|---|
| JP | 2012-528015 | A | 11/2012 |
| JP | 2014-117781 | A | 6/2014 |
| JP | 2016-10824 | A | 1/2016 |
| JP | 2015-71206 | A | 4/2016 |
| JP | 6038417 | B1 | 12/2016 |
| JP | 2018-69366 | A | 5/2018 |
| JP | 2018-167361 | A | 11/2018 |
| WO | WO 2015/137167 | A1 | 9/2015 |
| WO | WO 2019/092792 | A1 | 5/2019 |
| WO | WO 2020/066949 | A1 | 4/2020 |

OTHER PUBLICATIONS

Japanese-language Written Opinion (PCT/ISA/237) issued in PCT Application No. PCT/JP2020/025077 dated Sep. 24, 2020 (seven (7) pages).
International Preliminary Report on Patentability (PCT/IB/338 & PCT/IPEA/409) issued in PCT Application No. PCT/JP2020/025077 dated May 26, 2021 (14 pages).
Terada et al., "Mobile Gripping Robot HSR-2015 Utilizing a Small Degree-Of-Freedom Arm and an Omnidirectional Trolley", The Robotics Society of Japan, Sep. 3, 2015, pp. 1-4, (four (4) pages).
Extended European Search Report issued in European Apptication No. 20941533.0 dated Feb. 23, 2024 (8 pages)

* cited by examiner

[FIG. 2]
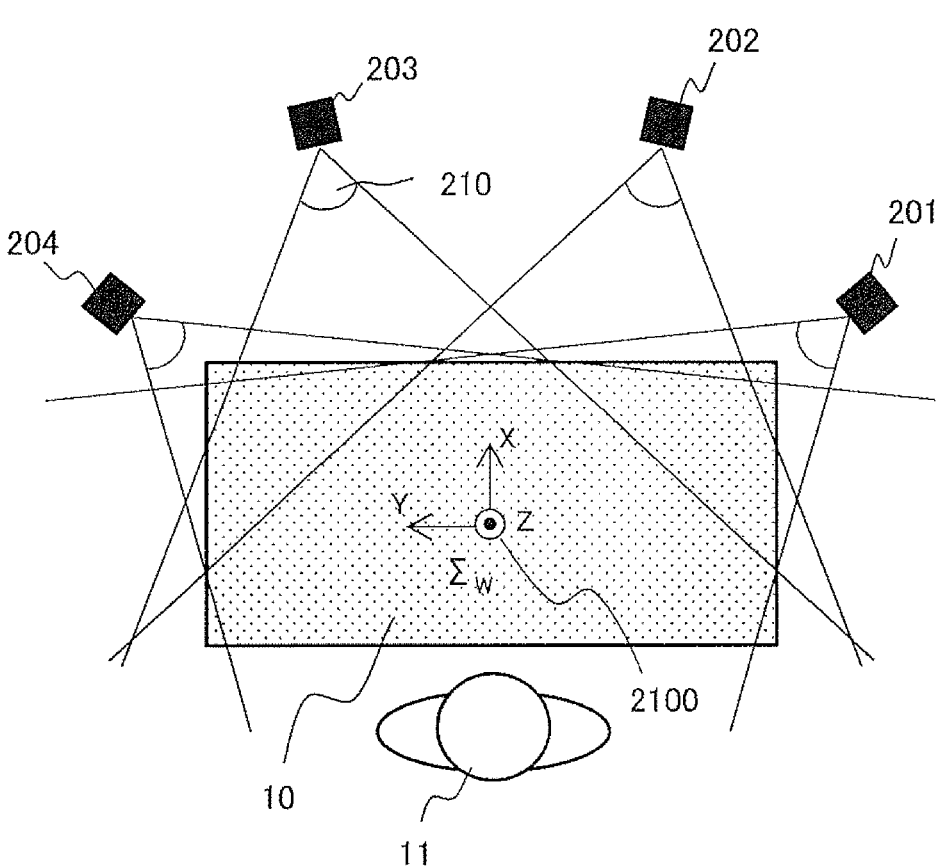

[FIG. 8]
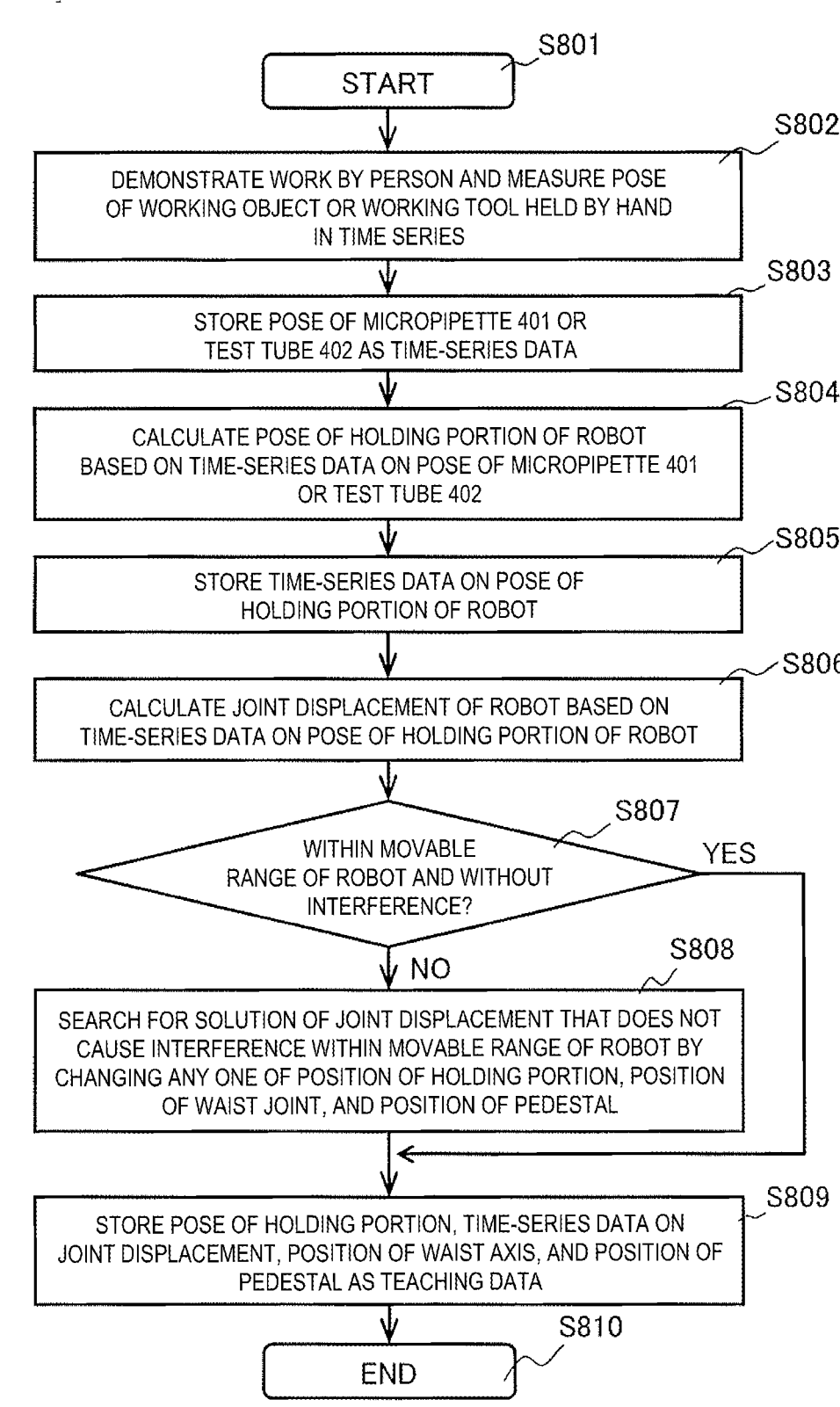

[FIG. 12]
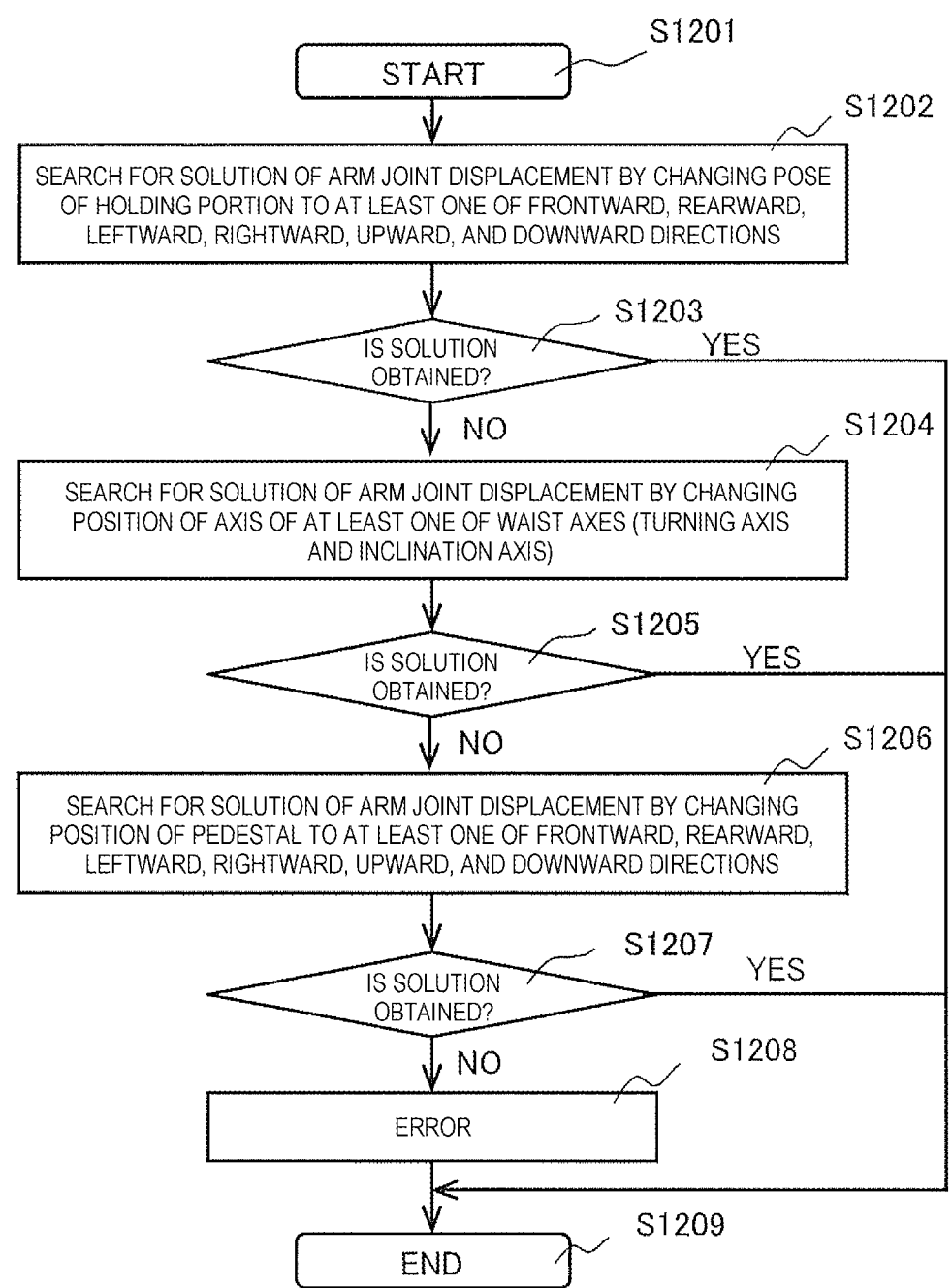

[FIG. 13]
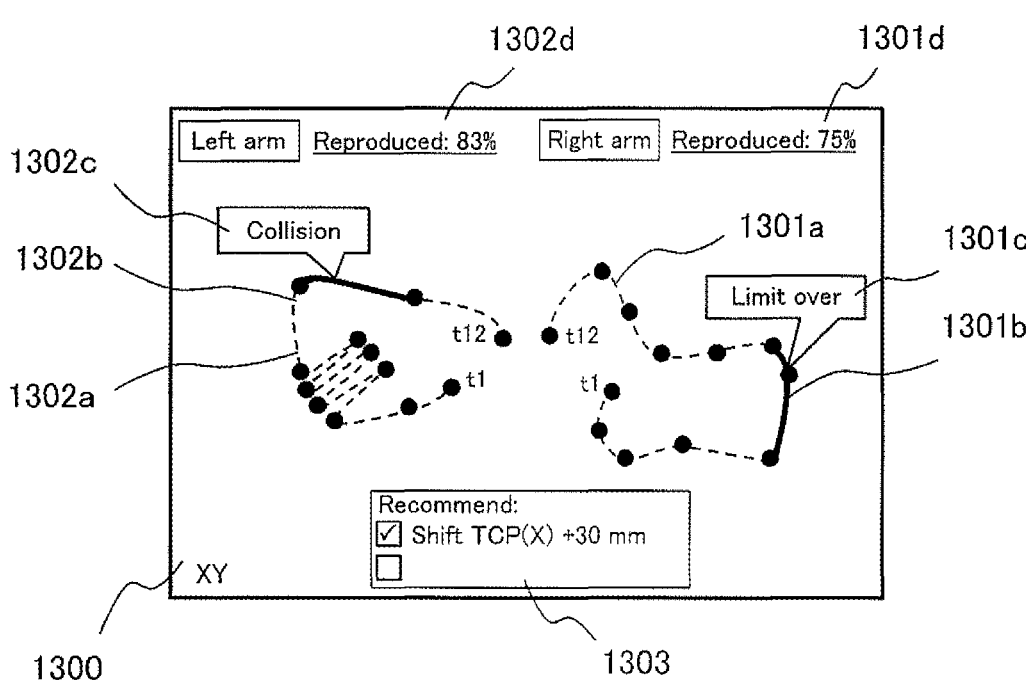

[FIG. 14]
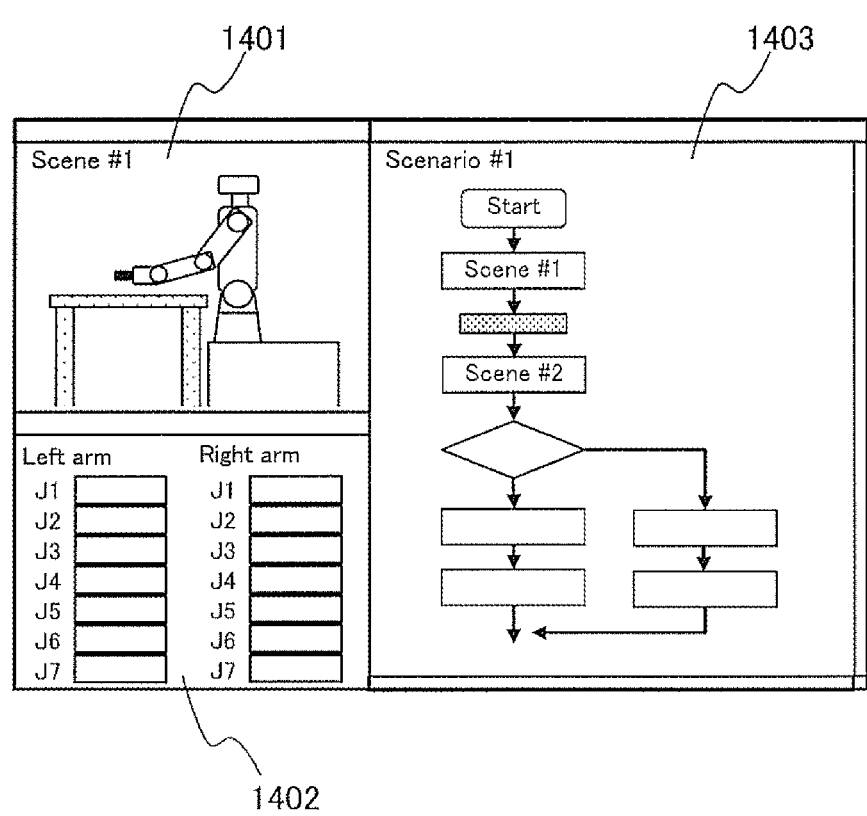

[FIG. 15]
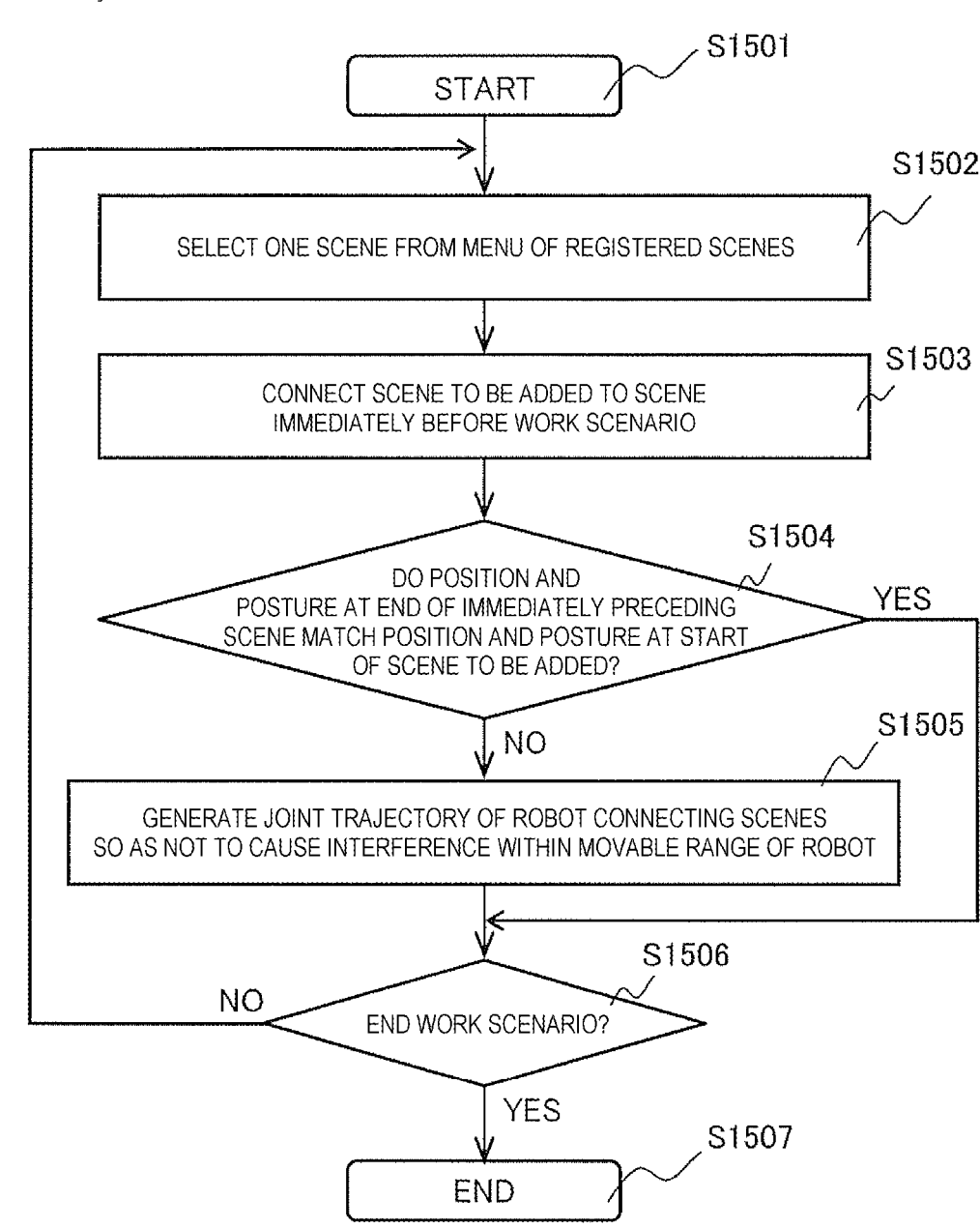

ROBOT TEACHING DEVICE AND WORK TEACHING METHOD

TECHNICAL FIELD

The present invention relates to a robot teaching device and a work teaching method for teaching a work motion to a robot.

BACKGROUND ART

There is known a robot teaching device that teaches a work motion to a robot by detecting the work motion or the like of a person with a sensor, a camera, or the like. For example, a robot teaching device according to PTL 1 detects a motion of a hand of a teacher and generates a motion trajectory of the robot corresponding to the motion.

In related-art robot teaching devices including that according to PTL 1, a motion of the robot is generated based on the motion of the teacher, but a motion of a working object may not be accurately detected. For this reason, depending on a type of the robot used for the work, a work content, a work environment, and the like, it may not be possible to generate an operation in which the robot can perform the work, for example, when an operation is not realized within a movable range of the robot or when interference occurs between the robot and a surrounding structure.

CITATION LIST

Patent Literature

PTL 1: Japanese Patent No. 6038417

SUMMARY OF INVENTION

Technical Problem

In view of the above-described problems, an object of the invention is to provide a robot teaching device and a work teaching method capable of generating an operation in which a robot can perform work without causing interference with a surrounding structure within a movable range of the robot.

Solution to Problem

A robot teaching device according to the invention relates to a robot teaching device that teaches work to a robot that holds and moves a held object. The device includes a teaching pose measurement unit configured to measure and/or calculate a teaching pose that is a pose of a first held object held by a teacher during teaching work, and a robot operation generation unit configured to generate a joint displacement sequence of the robot such that a pose of a second held object held by the robot becomes the same pose as the teaching pose.

Advantageous Effects of Invention

According to the invention, it is possible to provide a robot teaching device and a work teaching method capable of generating an operation in which a robot can perform work without causing interference with a surrounding structure within a movable range of the robot.

BRIEF DESCRIPTION OF DRAWINGS

FIG. 2 is a schematic diagram showing an arrangement example of cameras 201 to 204 constituting a teaching pose measurement unit 101.

FIG. 8 is a flowchart showing an operation of the robot teaching device 100 according to the first embodiment.

FIG. 12 is a flowchart showing a flow of processing of searching for a solution of joint displacement by changing positions of the holding centers of the hands, a position of the waist axis, and a position of the pedestal of the robot 12 by the robot operation generation unit 103.

FIG. 13 is an example of a screen that visualizes operation trajectories of the holding centers of the hands of the robot 12 in the robot operation generation unit 103.

FIG. 14 shows an example of a user interface screen in a work scenario editing unit 105.

FIG. 15 is a flowchart showing an operation according to a second embodiment.

DESCRIPTION OF EMBODIMENTS

Hereinafter, embodiments will be described with reference to the accompanying drawings. In the accompanying drawings, elements having the same functions may be denoted by the same reference number. The accompanying drawings show embodiments and implementation examples according to the principle of the present disclosure, but these are for understanding of the present disclosure and are not used to limit the present disclosure. Description in the present specification is merely exemplary, and is not intended to limit the scope of the claims or application examples of the present disclosure in any sense.

While the present embodiment has been described in sufficient detail for those skilled in the art to carry out the present disclosure, it is necessary to understand that other implementations and aspects are possible, and changes: in configuration and structure and replacement of various elements are possible without departing from the scope and spirit of the technical idea of the present disclosure. Therefore, the following description should not be construed as being limited thereto.

First Embodiment

Figure 1:
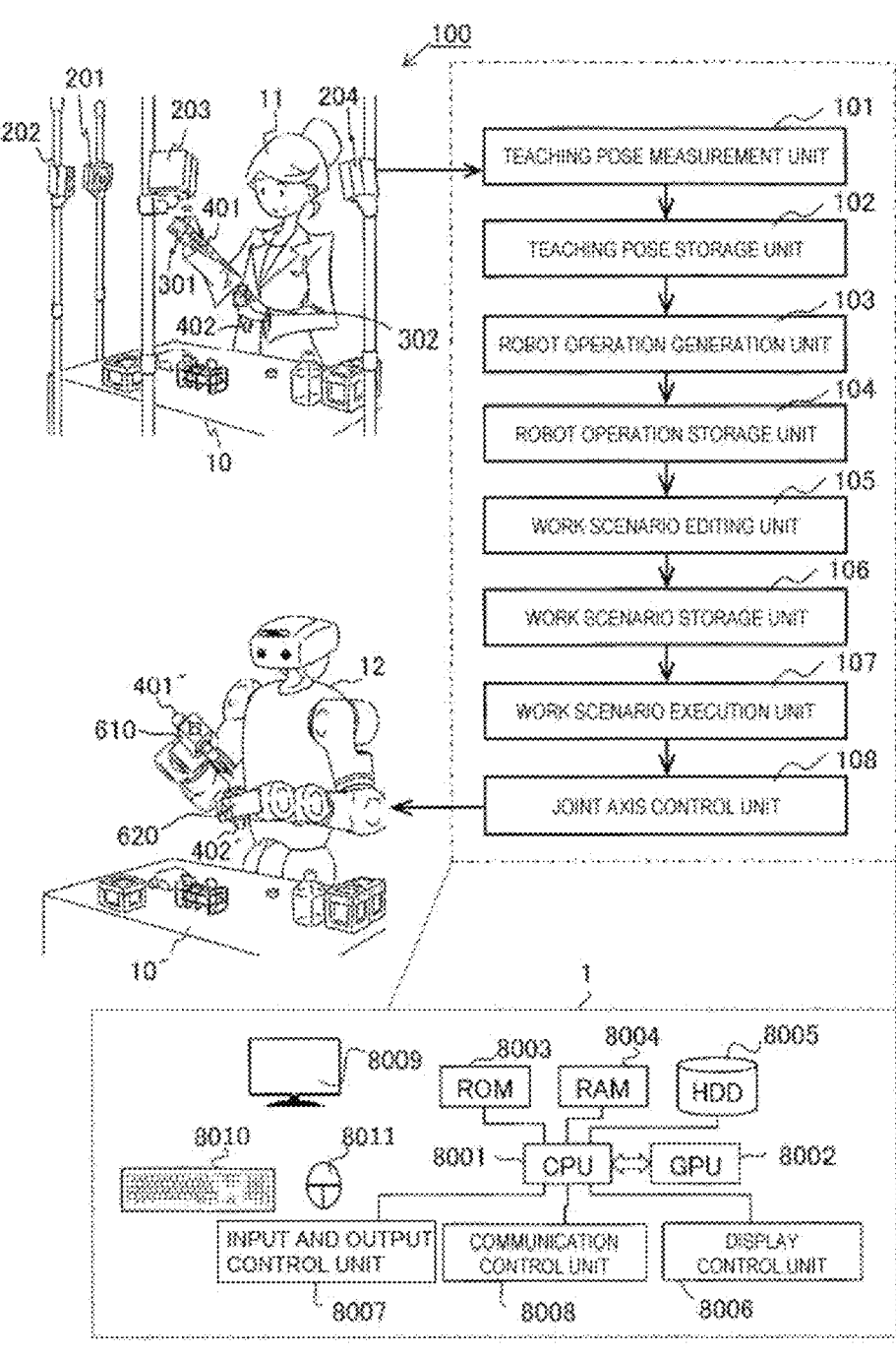
FIG. 1 is a schematic diagram showing an overall configuration of a robot teaching device 100 according to a first embodiment.

A robot teaching device and a work teaching method according to a first embodiment will be described with reference to the drawings. FIG. 1 is a configuration diagram of a robot teaching device 100 according to the first embodiment.

The robot teaching device 100 includes a computer 1 and a plurality of (four in the shown example) cameras 201 to 204 for motion capture. The computer 1 generates data for teaching an operation to a robot 12 based on images acquired by the cameras 201 to 204.

The computer 1 includes, for example, a central processing unit (CPU) 8001, a graphics processing unit (GPU) 8002, a ROM 8003, a RAM 8004, a hard disk drive (HDD) 8005, a display control unit 8006, an input and output control unit 8007, a communication control unit 8008, a display 8009 (display unit), a keyboard 8010, and a mouse 8011. The CPU 8001 is a central control device that controls the entire operation of a teaching program. The GPU 8002 is, for example, a control device for executing image processing and image recognition based on images obtained from the cameras 201 to 204.

The ROM 8003 is a storage device that stores a teaching program and various data necessary for executing the teaching program. The RAM 8004 is a storage device that temporarily stores a calculation result and the like of the program. The hard disk drive 8005 stores work scenario data generated by a teaching operation.

The display control unit 8006 is a control unit in charge of display control when an execution screen or the like of the program described above is displayed on the display 8009. The input and output control unit 8007 is a control unit that controls input of data and commands from various input devices (the keyboard 8010, the mouse 8011, and the like) and output of various data output from the CPU 8001 or the GPU 8002. The communication control unit 8008 is a control unit that controls data communication with a server or other external computers.

In the robot teaching device 100, a teacher 11 works facing a work table 10 in order to teach the robot 12. For example, the teacher 11 dispenses a reagent into a test tube 402, which is a working object (held object) held by a left hand, using a micropipette 401, which is a working tool (held object) held by a right hand. The micropipette 401 is attached with a right marker plate 301 for motion capture, while the test tube 402 is attached with a left marker plate 302 for motion capture. The right marker plate 301 and the left marker plate 302 are imaged by the cameras 201, 202, 203, 204. The micropipette 401 and the test tube 402 here are examples of the held object to be held by the teacher 11, and the held object is not limited thereto.

The teacher 11 is a subject who teaches work to the robot 12. The teacher 11 is basically human, and may be a robot. That is, the robot that has been taught work becomes the teacher 11, and can teach the work to another robot 12.

In order to automate such human work by the robot, an motion of the micropipette 401 and the test tube 402 by the teacher 11 is imaged by the cameras 201 to 204, the motion is analyzed by the computer 1, and the analysis result is taught to the robot 12. In the shown example, the robot 12 is a dual-arm robot 12, but is not limited thereto. For example, the robot may be a combination of two robots, that is, a single arm robot with a right arm and a single arm robot with a left arm. The two robots may be different types of robots. It is also possible to reproduce work of the teacher with two arms by a robot with three or more arms. The robot 12 is not limited to one simulating a human body shape as shown, and is not limited to a specific shape as long as it can perform a desired operation. In addition, the robot 12 may include a pedestal as will be described later. In the present embodiment, "robot" means all machine elements that operate according to a work scenario generated by the computer 1.

The robot 12 is installed facing a work table 10' similar to the work table 10. The robot 12 is taught to dispense a reagent into a test tube 402' held by a left hand 620 using a micropipette 401' held by a right hand 610. The micropipette 401' and the test tube 402' (second held objects) correspond to the micropipette 401 and the test tube 402 (first held objects) held by the teacher 11. The micropipette 401' and the test tube 402' may respectively have the same shapes as the micropipette 401 and the test tube 402, but do not need to be completely the same, and may be of the same type as long as a difference in shape is understood, or may differ in shape, material, and other properties. Each of the micropipette 401' and the test tube 402' held by the robot 12 during teaching may not have a structure that can be actually used, and may be, for example, a model (dummy).

The computer 1 implements components 101 to 108 to be described below in the computer 1 according to a teaching program stored in the ROM 8003 or the like.

A teaching pose measurement unit 101 measures a three-dimensional position and/or posture of each of the held objects (the micropipette 401 and the test tube 402) held by the teacher 11 according to images acquired by the cameras 201 to 204. Specifically, the teaching pose measurement unit 101 images the right marker plate 301 and the left marker plate 302 with the cameras 201, 202, 203, 204, and measures the three-dimensional position and/or posture of each of the right marker plate 301 and the left marker plate 302 in time series. Hereinafter, the three-dimensional position and/or posture of the object is referred to as a "pose". In other words, the "pose" may be data including, in addition to (or instead of) a position of the held object, inclination, rotation, and the like thereof. The teaching pose measurement unit 101 is implemented by the marker plates 301, 302, the cameras 201 to 204, and an arithmetic processing unit in the computer 1. The teaching pose measurement unit 101 measures and/or calculates, based on the obtained pose, a trajectory of at least one reference point of the micropipette 401 or the test tube 402 that is the held object. In a broad sense, data on the trajectory is time-series data on positions of the reference point, and may be data on a continuous curve or data on an intermittent point sequence.

A teaching pose storage unit 102 stores, as time-series data, poses of the right marker plate 301 and the left marker plate 302 measured by the teaching pose measurement unit 101.

A robot operation generation unit 103 converts the poses of the right marker plate 301 and the left marker plate 302 stored in the teaching pose storage unit 102 into poses of holding centers (also referred to as tool center points) of the right hand 610 and the left hand 620 of the robot 12, and calculates, as a solution of inverse kinematics calculation, a joint displacement sequence of the robot 12 that implements the poses of the holding centers. When the teaching pose is generated as the time-series data, operation data generated by the robot operation generation unit 103 can also be data synchronized with the time-series data on the teaching pose. By synchronizing both data, it is possible to accurately reproduce the operation of the teacher 11 also in terms of time. The robot operation generation unit 103 generates the joint displacement sequence based on the trajectory of at least one reference point of the micropipette 401 or the test tube 402 that is the held object.

A robot operation storage unit 104 stores the time-series data on the pose of the holding centers and joint displacement of the right hand 610 and the left hand 620 of the robot 12, calculated by the robot operation generation unit 103.

A work scenario editing unit 105 treats, as data on a unit operation for a certain period of time, the time-series data on the pose of the holding centers of the right hand 610 and the left hand 620 and the time-series data on the joint displacement of the robot 12, which are stored in the robot operation storage unit 104, and describes a series of work including at least one unit operation as a "work scenario". A work scenario storage unit 106 stores work scenarios described by the work scenario editing unit 105.

A work scenario execution unit 107 sequentially interprets the work scenarios stored in the work scenario storage unit 106, and outputs a joint axis drive command for causing the robot 12 to execute a unit operation. A joint axis control unit 108 executes the joint axis drive command for the robot 12 output by the work scenario execution unit 107, and controls each joint axis of the robot 12.

It is not necessary to measure all the processes of the work to be taught as the time-series data of the same cycle. For example, in a process that requires reproducibility of a precise motion, a measurement sampling period may be set short, while in a process that only needs to obtain reproducibility of a rough motion, a measurement sampling period may be set long. There is also work in which only a pose at the start and a pose at the end of an operation are required to be accurately reproduced, and in this case, a teaching pose may only include the pose at the start and the pose at the end of the motion.

FIG. 2 shows an arrangement example of the cameras 201 to 204 in the teaching pose measurement unit 101 shown in FIG. 1. In order to measure the poses of the held objects (for example, the micropipette 401 and the test tube 402) held by the teacher 11 who works facing the work table 10, the cameras 201 to 204 are arranged on a side opposite to the teacher 11 across the work table 10.

The cameras 201 to 204 have fields of view 210 set so as to overlap each other on the work table 10, thereby covering the entire working area on the work table 10, and imaging poses of the working tool (micropipette 401) as the held object and the working object (test tube 402) as the held object. A work table coordinate system 2100 (ΣW in the drawing) serving as a reference coordinate system for motion capture is set on the work table 10, and the pose of the held object (working tool and working object) measured by the motion capture is expressed as a pose in the work table coordinate system 2100.

Figures 3A, 3B:
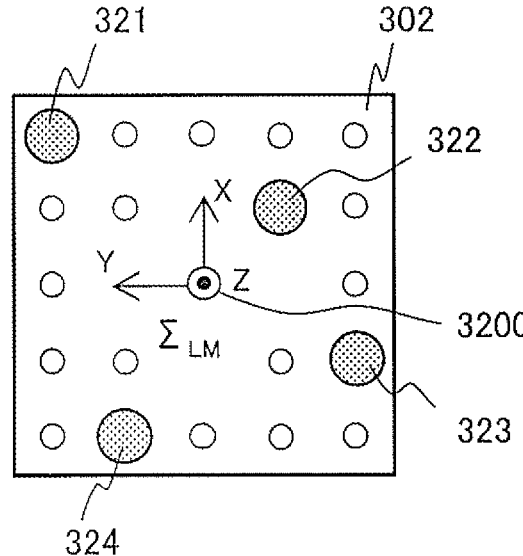
FIGS. 3A and 3B show schematic diagrams showing configuration examples of marker plates 301, 302, respectively, constituting the teaching pose measurement unit 101.

(a) and (b) in FIG. 3 show specific configuration examples of the marker plates 301, 302, respectively. The marker plates 301, 302 include substrates S1, S2, respectively. Reflective markers 311 to 314 are arranged on the substrate S1, and reflective markers 321 to 324 are arranged on the substrate S2. (a) and (b) in FIG. 3 also show marker plate coordinate systems 3100 (ΣRM), 3200 (ΣLM) set for the marker plates 301, 302, respectively.

The reflective markers 311 to 314 are arranged asymmetrically in a left-right direction and an upper-lower direction with respect to the substrate S1. The pose of the right marker plate 301 can be measured by registering an arrangement pattern of the reflective markers 311 to 314 in the computer 1. A posture of the held object to be detected can be easily determined by adopting an asymmetric arrangement in the left-right direction and the upper-lower direction. The marker plate coordinate system 3100 is defined as a coordinate system whose origin is a center of the right marker plate 301 when the arrangement pattern of the reflective markers 311 to 314 is registered in a motion capture system.

Similarly, the reflective markers 321 to 324 are arranged asymmetrically in the left-right direction and the upper-lower direction with respect to the substrate S2. Arrangement patterns of the reflective markers on the right marker plate 301 and the left marker plate 302 may be different from each other. When the arrangement patterns are different from each other, the teaching pose measurement unit 101 can easily identify the pose of each of the right marker plate 301 and the left marker plate 302 based on the arrangement pattern. Instead of using different arrangement patterns, colors of the reflective markers 311 to 314 may be different from those of the reflective markers 321 to 324 to identify the left and right sides. The number of reflective markers may be different between the right marker plate 301 and the left marker plate 302. The left and right sides can be easily identified based on a difference in the number.

Figure 4A:
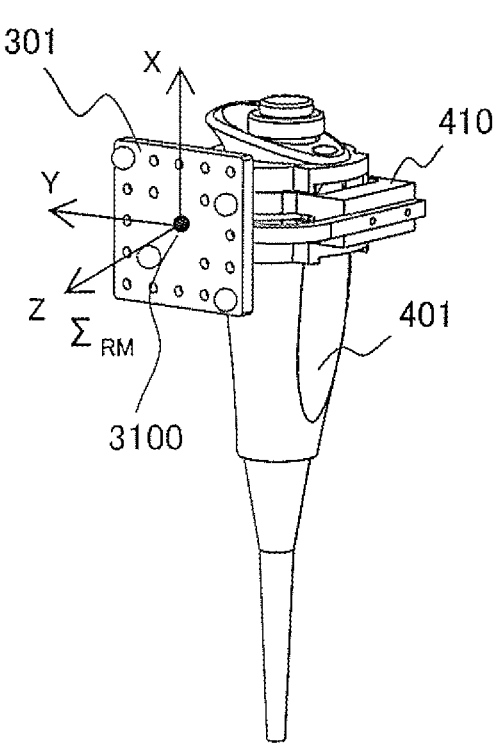
FIGS. 4A and 4B show perspective views showing states in which the marker plates 301, 302 constituting the teaching pose measurement unit 101 are attached to a micropipette 401 and a test tube 402, respectively.
Figure 4B:
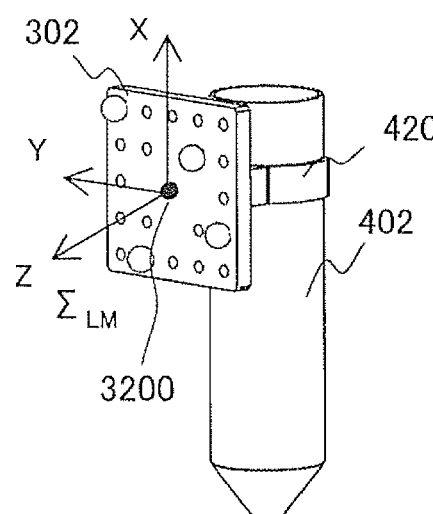

(a) and (b) in FIG. 4 show states in which the marker plates 301, 302 are attached to the micropipette 401 and the test tube 402, respectively. As shown in (a) in FIG. 4, the micropipette 401 is provided with an attachment 410 for attaching the right marker plate 301. Similarly, as shown in (b) in FIG. 4, the test tube 402 is provided with an attachment 420 for attaching the left marker plate 302. The marker plates 301, 302 are attached to the micropipette 401 and the test tube 402, respectively, such that one of axes (for example, an X axis) of each of the coordinate systems 3100, 3200 substantially matches vertical directions of the micropipette 401 and the test tube 402.

Figure 5A:
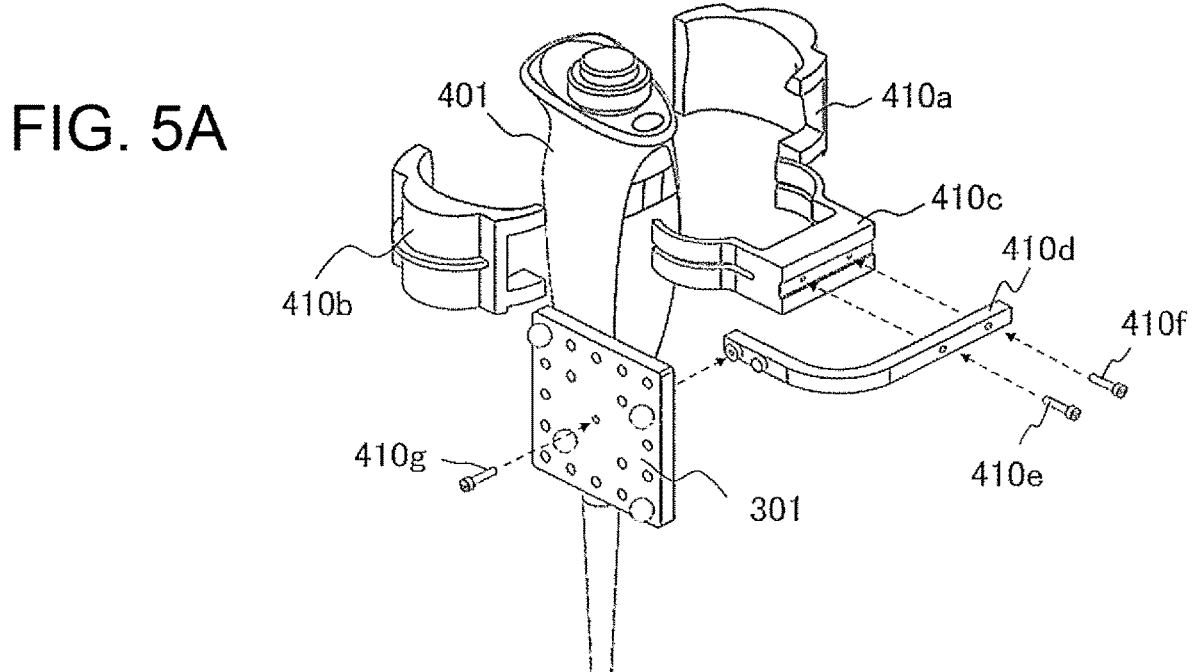
FIGS. 5A and 5B show exploded views of the marker plates 301, 302 attached to the micropipette 401 and the test tube 402, and attachments 410, 420 for attaching the marker plates 301, 302, respectively.
Figure 5B:
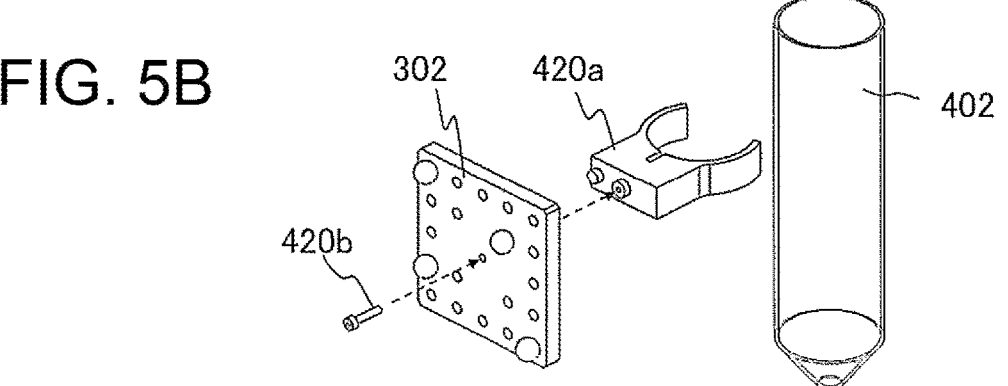

FIG. 5 is an exploded view of the attachment 410 shown in FIG. 4. As shown in (a) in FIG. 5, the attachment 410 is attached to the micropipette 401 by assembling components 410a to 410g shown in (a) in FIG. 5 while surrounding the micropipette 401. Specifically, after the C-shaped member 410c is fitted to the micropipette 401, the semicircular members 410a, 410b are fitted and fixed to a groove on an outer periphery of the C-shaped member 410c. Thereafter, the L-shaped member 410d is screwed to the C-shaped member 410c by screws 410e, 410f. The right marker plate 301 can be fixed to the assembled attachment 410 by a screw 410g. The attachment 410 has a shape and position that do not hinder the teacher 11 from holding and operating the micropipette 401, whereby the pose of the micropipette 401 can be easily measured by motion capture while the teacher 11 is working.

As shown in (b) in FIG. 5, the attachment 420 may include a C-shaped member 420a. A C-shaped portion of the C-shaped member 420a has an inner diameter substantially the same as an outer diameter of the test tube 402, and can hold the test tube 402 with an elastic force. The left marker plate 302 can be fixed to a base portion of the C-shaped member 420a by a screw 420b. The attachment 420 has a shape that does not hinder the teacher 11 from holding and operating the test tube 402, whereby the pose of the test tube 402 can be easily measured while the teacher 11 is working.

Of course, each of the marker plates 301, 302 is attached to the working object or the working tool only when a person teaches the work.

Figure 6A:
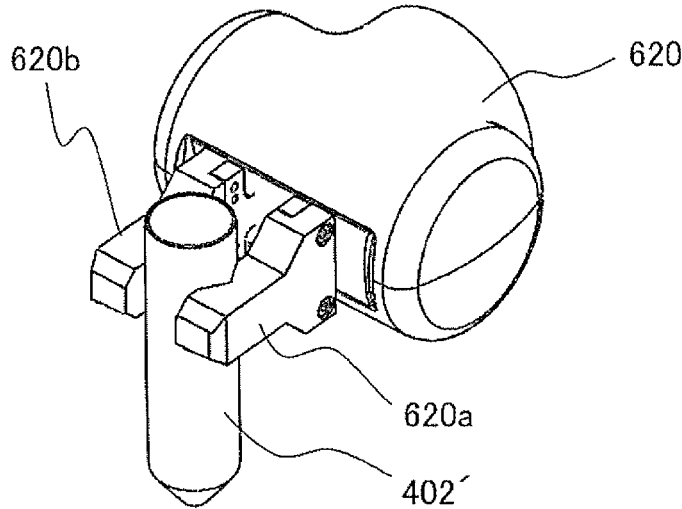
FIGS. 6A to 6C show perspective views showing a structure of a hand 620 of a robot 12 holding a test tube 402'.
Figure 6B:
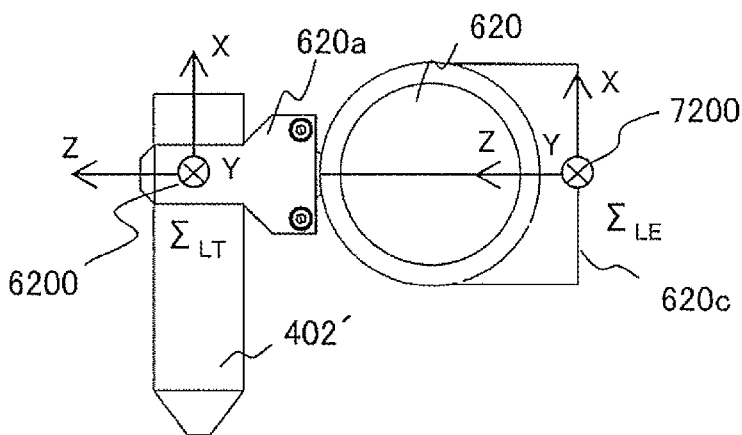
Figure 6C:
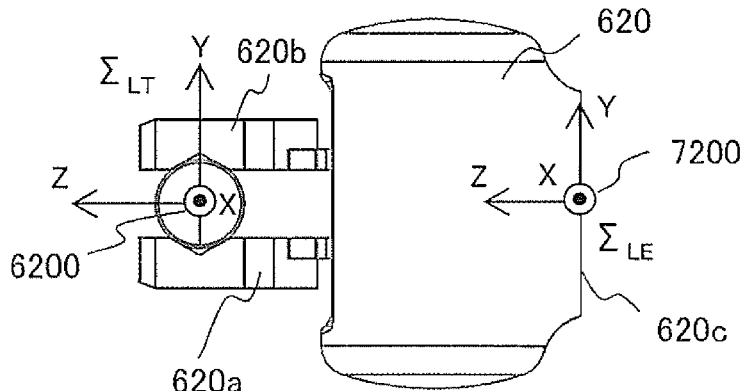

(a) in FIG. 6 is a perspective view showing a state in which the test tube 402' is held by the left hand 620 of the robot 12. The left hand 620 is provided with two fingers 620a, 620b, and the fingers 620a, 620b are movable in the left-right direction by a slide drive mechanism (not shown). The test tube 402' is held by the left hand 620 when the test tube 402' is sandwiched by these fingers 620a, 620b. (b) and (c) in FIG. 6 are a side view and a top view, respectively, of the left hand 620, and show a positional relationship between a left holding portion coordinate system 6200 (ΣLT in the drawing) set at a holding center of the fingers 620a, 620b of the left hand 620 and a left link tip coordinate system 7200 (ELE in the drawing) set at a center of a left wrist flange 620c of the robot 12 attached with the left hand 620. Although not shown, the right hand 610 of the robot 12 can have substantially the same structure as that of the left hand 620, and can hold the micropipette 401' in the same manner.

Figures 7A, 7B:
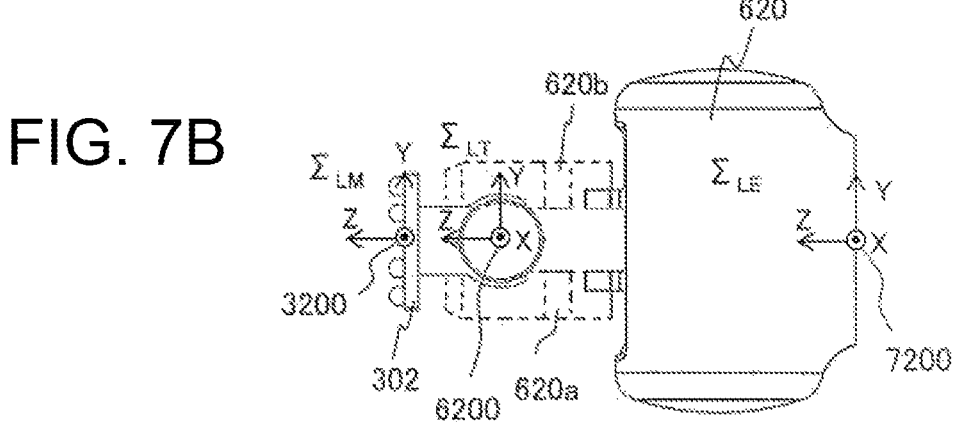
FIGS. 7A and 7B show diagrams showing a relationship between the hand 620 of the robot 12 holding the test tube 402' and the coordinate systems.

FIG. 7 shows diagrams showing a relationship between the coordinate system 7200 set for the left hand 620 of the robot 12 holding the test tube 402' and the left marker plate coordinate system 3200 set for the left marker plate 302. For ease of understanding, FIG. 7 virtually shows a state in which the marker plate 302 is attached to the test tube 402'.

As shown in (a) and (b) in FIG. 7, the left marker plate coordinate system 3200 is obtained by translating the left holding portion coordinate system 6200 by a distance Lm in a Z-axis direction, and the left holding portion coordinate system 6200 is obtained by translating the left link tip coordinate system 7200 by a distance Lt in the Z-axis direction. When the pose of the left marker plate 302 is measured based on the relationship between these coordinate systems, a pose of the holding center of the left hand 620 at that time can be calculated, and a pose of the center of the left wrist flange 620c can be further calculated. That is, the robot operation generation unit 103 is configured to measure and/or calculate a pose of a holding portion of the robot 12 by coordinate transformation based on a positional relationship between a held object coordinate system (3100, 3200) with reference to the held object and a holding portion coordinate system (6200, 7200) with reference to the holding portion of the robot 12. In addition, the robot operation generation unit 103 is configured to calculate a pose of a link tip of the robot based on the teaching pose by coordinate transformation based on a positional relationship between the holding portion coordinate system with reference to the holding portion of the robot 12 and a link tip coordinate system with reference to a center of a wrist flange of the robot. Then, the robot operation generation unit 103 calculates a joint displacement of the robot 12 as a solution of the inverse kinematics calculation based on time-series data on the pose of the link tip, and generates a joint displacement sequence.

When the pose of the center of the wrist flange 620c is known, a joint displacement sequence of an arm of the robot 12 is obtained as a solution of the inverse kinematics calculation in a link mechanism of the arm of the robot 12. A positional relationship among the coordinate systems 3200, 6200, and 7200 is not limited to the relationship obtained by translation in the Z direction as described above, and any positional relationship may be used as long as the relationship is known. The positional relationship among the coordinate systems does not need to be fixed, and may vary as long as the relationship is known.

The above example shows that the pose of the held object is measured by optically detecting light from the marker plate with the cameras 201 to 204, but instead, a motion capture system in which a motion of the held object is magnetically detected using a Hall element or the like may be adopted. Alternatively, it is also possible to adopt a system in which a motion of the held object or the teacher 11 is photographed by a camera without using the marker plate, and an image thereof is analyzed.

A procedure of the robot teaching device according to the first embodiment will be described with reference to a flowchart in FIG. 8. When the procedure is started (step S801), the teacher 11 demonstrates work using the micropipette 401 (working tool) and the test tube 402 (working object). At this time, the teaching pose measurement unit 101 including the cameras 201 to 204 measures poses of the micropipette 401 and the test tube 402 held by the teacher 11 in his/her hands in time series (step S802).

Next, the poses of the micropipette 401 and the test tube 402 measured in step S802 are stored in the teaching pose storage unit 102 as time-series data on a teaching pose (step S803). Further, poses of holding centers of holding portions (the right hand 610 and the left hand 620 described above) of the robot 12 are calculated based on the time-series data on the poses of the micropipette 401 and the test tube 402 (step S804). Then, the calculated poses of the holding portions of the robot 12 are stored as time-series data (step S805).

Further, a joint displacement sequence of arms of the robot 12 is calculated as a solution of the inverse kinematics calculation based on the time-series data on the poses of the holding portions of the robot 12 (step S806). Here, it is determined whether there is a possibility that the calculated joint displacement of the arms exceeds a movable range of the robot 12, or interference occurs between the robot 12 and a surrounding structure when the robot 12 is driven according to the calculated joint displacement sequence (step S807). Data on a position and shape of the surrounding structure is stored in advance in the robot operation generation unit 103, specifically, in the HDD 8005 or the like.

When an excess of the movable range of the robot 12 or an occurrence of interference is predicted (NO), any one of the poses of the holding portions of the robot 12 (the same as the pose of the held objects), a position of a waist joint (waist axis) of the robot 12 that is not a driving target before step S807, and a position of the pedestal on which the robot 12 is mounted is changed, thereby searching for a solution of the joint displacement sequence that does not cause interference with the surrounding structure within the movable range of the robot 12 (step S808). As a result, when the solution of the joint displacement sequence is obtained, the robot operation generation unit 103 sets time-series data on the joint displacement obtained here as robot operation data.

When the joint displacement calculated in step S806 does not cause interference with the surrounding structure even if the robot 12 is driven according to the calculated joint displacement sequence, within the movable range of the robot 12, the time-series data on the joint displacement calculated here is used as the robot operation data (step S807). When the joint displacement sequence of the robot 12 is obtained by the above processing, the poses of the holding portions of the robot 12, the time-series data on the joint displacement, the position of the waist axis, and the position of the pedestal are finally stored in the robot operation storage unit 104 as the robot operation data, and a series of processing is completed (step S809). Step S810 indicates the end of the process.

Figure 9A:
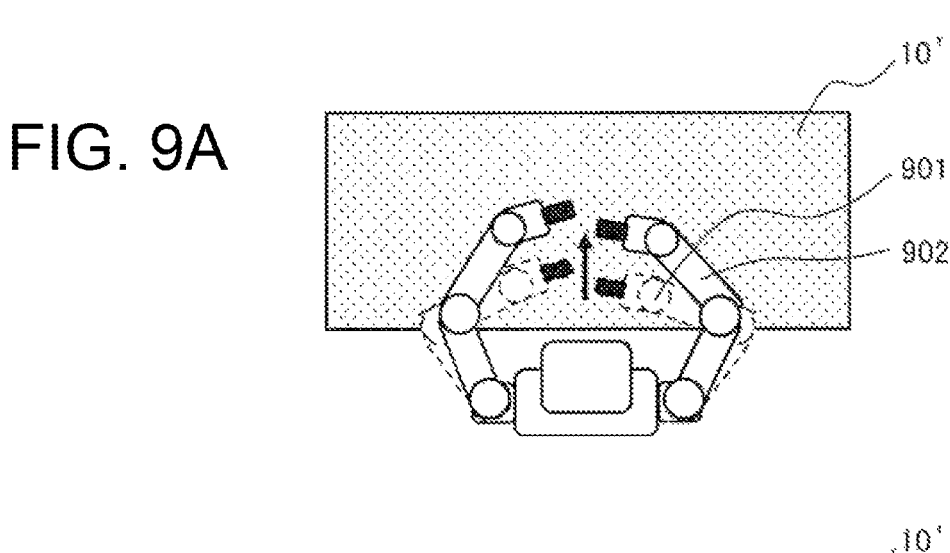
FIGS. 9A to 9C show schematic diagrams showing examples of changing positions of holding centers of hands of the robot 12 by a robot operation generation unit 103.
Figure 9B:
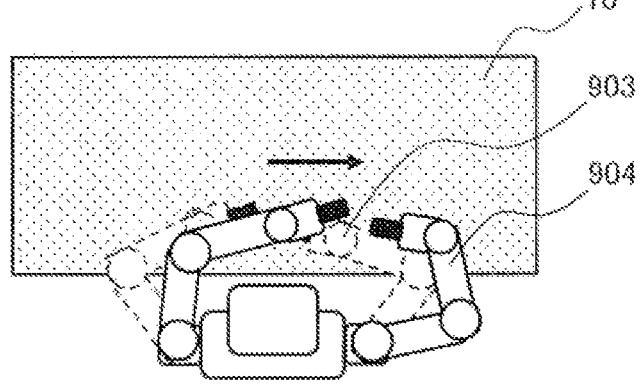
Figure 9C:
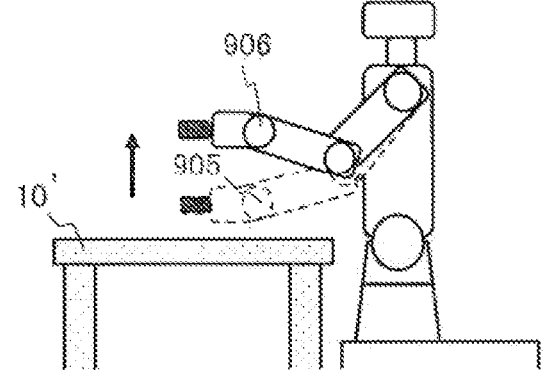

FIG. 9 shows diagrams showing specific examples of changing positions of the holding portions of the robot 12 by the robot operation generation unit 103 shown in FIG. 8 (step S808). (a) in FIG. 9 shows an example in which the holding portions are translated forward as viewed from the robot 12 (for example, a pose is changed from a pose 901 to a pose 902) while maintaining a relationship of relative positions and postures between the right hand 610 and the left hand 620 (holding portions) of the robot 12.

Similarly, (b) in FIG. 9 shows an example in which the holding portions of the robot 12 are translated rightward as viewed from the robot 12 (for example, a pose is changed from a pose 903 to a pose 904) while maintaining a relationship of relative positions and postures between the holding portions. (c) in FIG. 9 shows an example in which the holding portions of the robot 12 are translated upward as viewed from the robot 12 (for example, a pose is changed from a pose 905 to a pose 906) while maintaining a relationship of relative positions and postures between the holding portions.

As described above, although a teaching pose can be expressed as a pose according to the work table coordinate system 2100 set on the work table 10, depending on a relative positional relationship between the work table 10' and the robot 12, there are cases where the robot 12 cannot operate within the movable range of the robot 12, and where the robot 12 interferes with the surrounding structure on the work table 10' even if the robot 12 operates within the movable range. In such cases, an operation of the robot 12 cannot be simply generated according to the teaching pose. On the other hand, as shown in FIG. 9, there are many cases where the taught work content is not influenced even if the holding portions are translated while maintaining the relationship of relative positions and postures between the holding portions, and it is possible to take a pose without interfering with the surrounding structure within the movable range of the robot 12, that is, it is easy to operate for the robot 12.

Specific examples of changing the position of the waist axis of the robot by the robot operation generation unit 103 described in step S808 in FIG. 8 will be described with reference to FIG. 10. (a) in FIG. 10 shows an example in which a waist turning axis is rotated clockwise (right-handed) as viewed from the robot 12 (a pose is changed from a pose 1001 to a pose 1002) while maintaining a relationship of relative positions and postures between the holding portions of the robot 12.

Figure 10A:
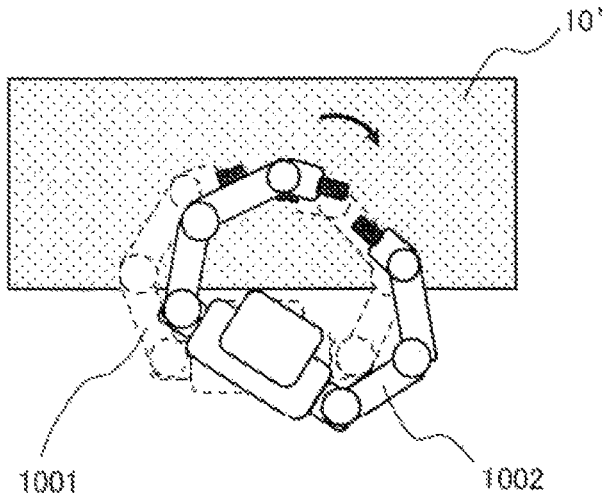
FIGS. 10A and 10 B show schematic diagrams showing examples of changing a position of a waist axis of the robot 12 by the robot operation generation unit 103.
Figure 10B:
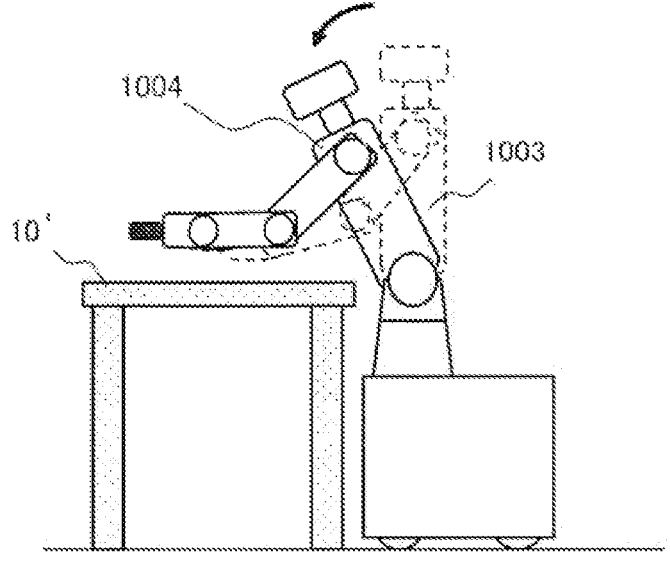

Similarly, (b) in FIG. 10 shows an example in which a waist inclination axis is rotated forward as viewed from the robot 12 (a pose is changed from a pose 1003 to a pose 1004) while maintaining a relationship of relative positions and postures between the holding portions of the robot 12. It is possible to take a pose that is easy to operate for the robot 12 by changing the position of the waist axis in this manner.

Figure 11A:
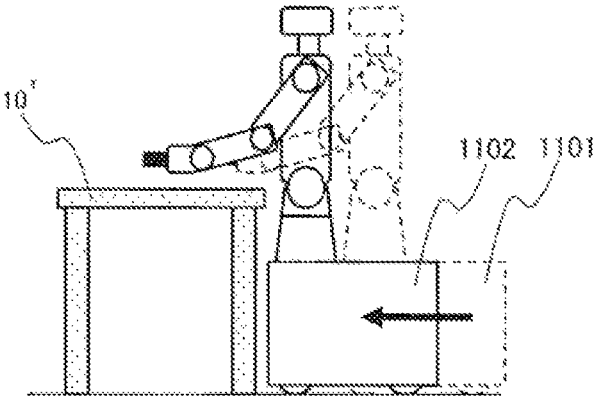
FIGS. 11A to 11C show schematic diagrams showing examples of changing a position of a pedestal of the robot 12 by the robot operation generation unit 103.
Figure 11B:
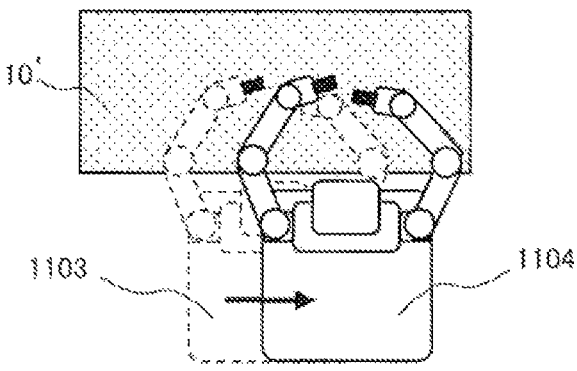
Figure 11C:
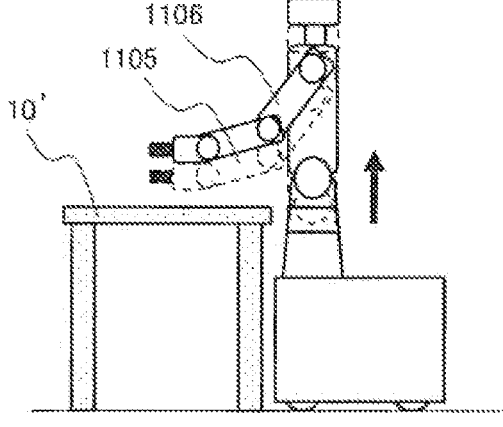

FIG. 11 shows diagrams showing examples of changing the position of the pedestal of the robot by the robot operation generation unit 103. (a) in FIG. 11 shows an example in which the position of the pedestal on which the robot 12 is mounted is moved forward as viewed from the robot 12 (a pose is changed from a pose 1101 to a pose 1102). Similarly, (b) in FIG. 11 shows an example in which the position of the pedestal on which the robot 12 is mounted is moved rightward when viewed from the robot 12 (a pose is changed from a pose 1103 to a pose 1104). (c) in FIG. 11 shows an example in which the position of the pedestal on which the robot 12 is mounted is moved upward as viewed from the robot 12 (a pose is changed from a pose 1105 to a pose 1106). It is possible to take a pose that is easy to operate for the robot 12 by changing the position of the pedestal in this manner.

An example in which the position of the pedestal on which the robot 12 is mounted is changed has been described in the present embodiment, but instead, it is also possible to mount the robot 12 on an unmanned transport vehicle and change a stop position of the unmanned transport vehicle.

Details of processing (step S808) of searching for a solution of joint displacement sequence by changing poses of the holding portions, a position of the waist axis, and a position of the pedestal of the robot by the robot operation generation unit 103 will be described with reference to a flowchart in FIG. 12, which begins with step S1201. When a joint displacement sequence that does not cause interference with the surrounding structure within the movable range of the robot 12 is not obtained as a solution of the inverse kinematics calculation from a teaching pose, first, the poses of the holding portions is changed to at least one of frontward, rearward, leftward, rightward, upward, and downward directions while maintaining a relationship of relative positions and postures between the holding portions of the robot 12, and a solution of the joint displacement sequence that does not cause interference with the surrounding structure within the movable range of the robot 12 is searched for (step S1202). Here, when the solution of the joint displacement sequence is obtained, the processing is completed (YES in step S1203, step S1209).

On the other hand, when the solution of the joint displacement sequence is not obtained (NO in step S1203), positions of the holding portions are changed by executing one (or both) of rotating the turning axis (see (a) in FIG. 10) and rotating the inclination axis (see (b) in FIG. 10) in the waist axes of a waist while maintaining the relationship of relative positions and postures between the holding portions of the robot 12, and the solution of the joint displacement sequence that does not cause interference with the surrounding structure within the movable range of the robot 12 is searched for (step S1204). When the solution of the joint displacement sequence is obtained, the processing is completed (YES in step S1205). On the other hand, when the solution of the joint displacement sequence is not obtained (NO in step S1205), the processing proceeds to step S1206.

In step S1206, the position of the pedestal is changed to at least one of frontward, rearward, leftward, rightward, upward, and downward directions while maintaining the relationship of relative positions and postures between the holding portions of the robot 12, and the solution of the joint displacement sequence that does not cause interference with the surrounding structure within the movable range of the robot 12 is searched for (step S1206). When the solution of the joint displacement sequence is obtained, the processing is completed (YES in step S1207).

On the other hand, when the solution of the joint displacement sequence is not obtained (NO in step S1207), an error is determined assuming that no solution was finally obtained for the teaching pose (step S1208), and the determination result is output to the display 8009 or the like. When an error finally occurs, teaching needs to be performed again.

Regarding the operation examples in (a) to (c) in FIG. 11, examples in which the solution of the joint displacement is searched for by changing each of the poses of the holding portions, the position of the waist axis, and the position of the pedestal of the robot 12 have been described, but the solution of the joint displacement may be searched for by changing these simultaneously or in parallel. For example, the solution of the joint displacement may be searched for by changing the position of the pedestal to a forward direction and further translating the poses of the holding portions of the robot 12 upward.

The robot operation generation unit 103 can automatically calculate a trajectory of the holding portion on a computer side and generate the trajectory as a robot operation, but as shown in FIG. 13, it is also possible to intervene determination (selection) of a user. FIG. 13 shows an example of a visualization screen 1300 that visualizes operation trajectories of holding centers of the hands 610, 620 of the robot 12 in the robot operation generation unit 103. The visualization screen 1300 can be displayed on the display 8009.

The visualization screen 1300 in FIG. 13 is a drawing in which trajectories obtained by projecting the operation trajectories of the holding centers of the right hand 610 and the left hand 620 of the robot 12 onto an XY plane of the work table coordinate system 2100 are drawn with curves. A dotted line 1301*a* indicates the trajectory of the holding center of the right hand 610 required when the measured teaching pose is implemented, and black circles indicate positions of the holding center at time points (t1 to t12).

In the curve, the dotted line 1301*a* indicates a portion in which the solution of the joint displacement sequence that does not cause interference with the surrounding structure within the movable range of the robot 12 is obtained for the teaching pose (that is, indicates a portion in which the robot 12 can be driven as requested by the teaching pose). On the other hand, a solid line 1301*b* indicates a portion in which the solution within the movable range of the robot 12 is not obtained (that is, indicates a portion in which the robot 12 cannot be driven as requested by the teaching pose). The solid line 1301*b* is also accompanied by a message 1301*c* (Limit over) indicating that the movable range is exceeded.

Similarly, a dotted line 1302*a* indicates the trajectory of the holding center of the left hand 620, and black circles indicate positions of the holding center at time points (t1 to t12). In the curve, the dotted line 1302*a* indicates a portion in which the solution of the joint displacement sequence that does not cause interference with the surrounding structure within the movable range of the robot 12 is obtained for the teaching pose. A solid line 1302*b* indicates a portion in which interference with the surrounding structure of the robot 12 occurs. The solid line 1302*b* is accompanied by a message 1302*c* (Collision) indicating occurrence of the interference.

When the time-series data on the teaching pose is converted into an operation of the robot 12, a ratio of the number of pieces of data, in which the solution of the joint displacement sequence that does not cause interference with the surrounding structure within the movable range of the robot 12 is obtained, to the total time-series data is defined as a motion reproduction rate. A motion reproduction rate 1301*d* of the right arm and a motion reproduction rate 1302*d* of the left arm are displayed on a visualization screen 1301.

When the solution within the movable range of the robot 12 cannot be obtained for the teaching pose, or when interference with the surrounding structure occurs even if the solution within the movable range is obtained, a countermeasure recommended for resolving the excess of the movable range or the interference is displayed in a countermeasure display field 1303 in the visualization screen 1301. The countermeasure presented here is obtained by searching for the solution of the joint displacement sequence shown in FIG. 12, and in the example of FIG. 13, the countermeasure display field 1303 displays a countermeasure to translate the holding portions of the robot 12 forward by 30 mm (in an X direction of the work table coordinate system 2100). When the user of the robot 12 selects the countermeasure presented here, final robot operation data is generated based on the countermeasure.

FIG. 14 is a diagram showing an outline of a user interface screen in the work scenario editing unit 105 shown in FIG. 1. The user interface screen may be displayed on the display 8009.

The user interface screen of the work scenario editing unit 105 includes a robot unit operation display portion 1401, a robot state display portion 1402, and a work scenario description portion 1403. The robot unit operation display portion 1401 selects a unit operation of the robot 12 stored in the robot operation storage unit 104, and displays the unit operation as a two-dimensional or three-dimensional moving image or a trajectory of the holding portion of the robot 12.

The robot state display portion 1402 displays states such as joint displacement of the robot 12, poses of the holding portions of the robot 12, and a position of the pedestal on which the robot 12 is mounted, which are displayed on the robot unit operation display portion 1401. The work scenario description portion 1403 describes a series of work scenarios of the robot 12 in a form of a flowchart, and can describe not only the unit operation of the robot 12 stored in the robot operation storage unit 104, but also an operation of the holding portion of the robot 12, an operation of the held object held by the robot 12, condition branching processing before and after the unit operation, repeating processing of the unit operation, and the like. The user can confirm the work scenario in the work scenario description portion 1403 and perform editing such as addition, change, and deletion of the work. For example, as shown in FIG. 14, in the work scenario description portion 1403, a new unit operation may be added between unit operations, scene #1 and scene #2.

As described above, according to the present embodiment, when an actual work motion of a person is to be converted into a work operation of a robot, a solution of joint displacement that does not cause interference with a surrounding structure within a movable range of the robot can be searched for and an an operation executable by the robot can be generated, therefore, the work operation of the robot can be easily taught based on the actual work of the person, and development efficiency of a robot system can be improved.

In the above embodiment, an example in which the work scenario is described in the form of the flowchart has been described, but instead, the work scenario may be described in a form of a state transition diagram, a timing chart, or the like.

Second Embodiment

Next, a robot teaching device and a work teaching method according to a second embodiment will be described with reference to FIGS. 15 and 16. In the robot teaching device according to the second embodiment, an overall configuration of hardware is the same as that of the first embodiment (FIGS. 1 to 6), and thus redundant description will be omitted below. A procedure of teaching the robot is also basically the same as that of the first embodiment (FIG. 8). However, the second embodiment includes an operation different from that of the first embodiment in the procedure of editing the work scenario.

An example of a procedure when the work scenario editing unit 105 executes processing of adding a unit operation to a work scenario according to the second embodiment will be described with reference to a flowchart in FIG. 15, which starts and ends with steps S1501 and S1507, respectively.

First, unit operations stored in the robot operation storage unit are read out, and the unit operations are described in an operation order thereof in the work scenario description portion 1403 (FIG. 14). Such a unit operation is referred to as a "scene".

The user views a scenario described as a sequence of scenes in the work scenario description portion 1403, and selects, from a menu of registered scenes, one scene to be added (step S1502).

Next, the scene to be added is connected to, for example, a scene immediately before the work scenario (step S1503). Here, it is determined whether a pose of the robot 12 at the end of the immediately preceding scene matches a pose at the start of the scene to be added (step S1504). When the poses do not match (NO), a joint displacement sequence (also referred to as a joint trajectory) of the robot 12 connecting the scenes by continuously interpolating is generated so as not to cause interference with a surrounding structure within a movable range of the robot 12 (step S1505).

On the other hand, when the pose of the robot 12 at the end of the immediately preceding scene matches the pose at the start of the scene to be added (step S1505), it is determined whether to end the work scenario. When the work scenario is not to be ended, the processing returns to step S1502 (step S1506), selects another scene from the menu, and adds the scene to the work scenario. On the other hand, when the work scenario is to be ended, a processing flow is completed (step S1506).

Figure 16A:
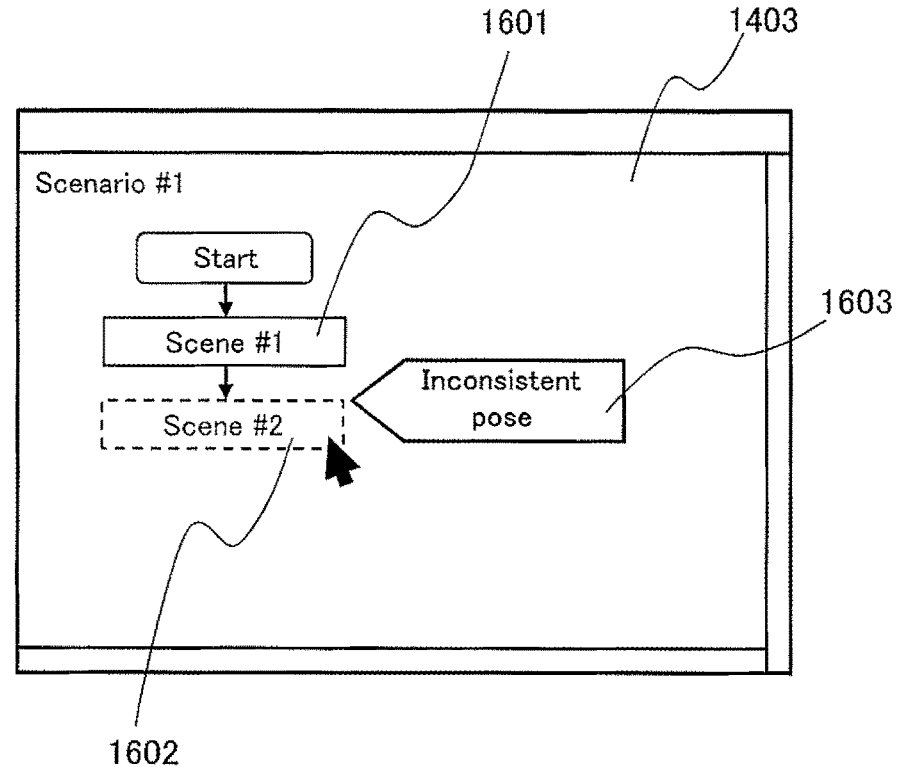
FIGS. 16A and 16B show an example of a display screen in the work scenario editing unit 105 according to the second embodiment.
Figure 16B:
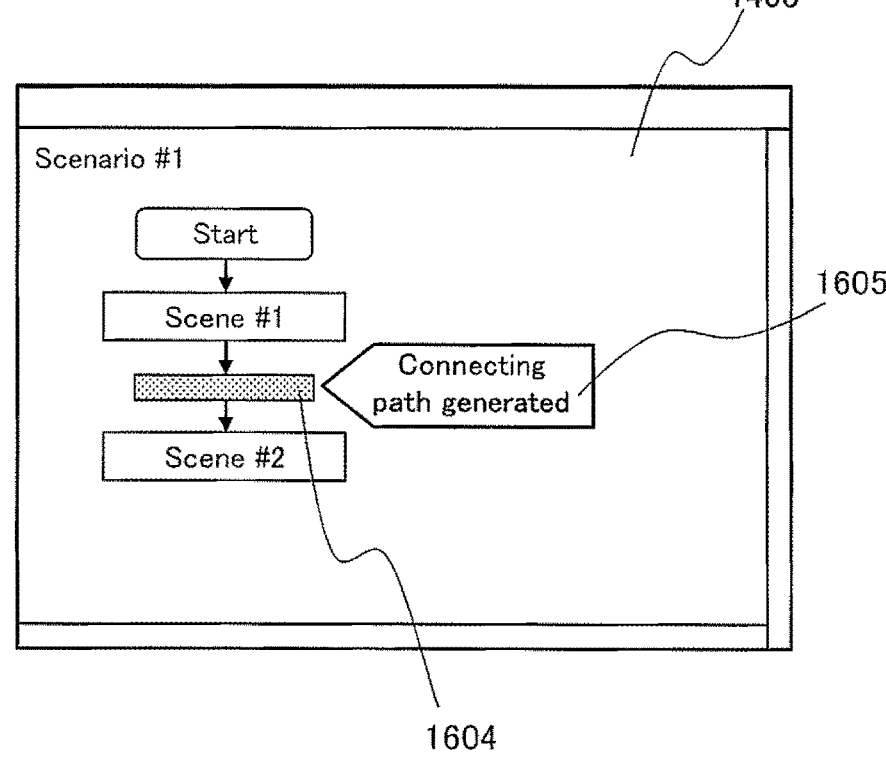

FIG. 16 shows an example of an execution screen when a scene is inserted in the work scenario editing unit 105. In (a) in FIG. 16, when a new scene is to be connected between a scene 1601 (Scene #1) and a scene 1602 (Scene #2), a message 1603 (Inconsistent pose) is displayed indicating that a pose of the robot 12 at the end of the immediately preceding scene 1601 does not match a pose at the start of the scene to be added. In (b) in FIG. 16, a joint trajectory 1604 connecting, by interpolating, the pose at the end of the immediately preceding scene and the pose at the start of the scene to be added is automatically inserted, and generation of the joint trajectory connecting in this way is displayed as a message 1605.

Others

The invention is not limited to the embodiments described above, and includes various modifications. For example, the embodiments described above have been described in detail for easy understanding of the invention, and the invention is not necessarily limited to those including all the configurations described above. A part of the configuration of one embodiment can be replaced with the configuration of another embodiment, and the configuration of one embodiment can be added to the configuration of another embodiment. In addition, a part of the configuration of each embodiment may be added to, deleted from, or replaced with another configuration.

REFERENCE SIGNS LIST

1 robot teaching device
10 work table
11 teacher
12 robot

201, 202, 203, 204 camera
210 field of view of camera
301, 302 marker plate
311 to 314, 321 to 324 reflective marker
401, 401' micropipette
402, 402' test tube
410, 420 attachment
610 right hand
620 left hand
620a, 620b finger of left hand 620
620c left wrist flange
2100 work table coordinate system
3100 right marker plate coordinate system
3200 left marker plate coordinate system
6200 left holding portion coordinate system
7200 left link tip coordinate system
8001 CPU
8002 GPU
8003 ROM
8004 RAM
8005 hard disk drive (HDD)
8006 display control unit
8007 input and output control unit
8008 communication control unit
8009 display unit
8010 keyboard
8011 mouse

The invention claimed is:

1. A robot teaching device for teaching work to a robot configured to hold and move a held object with a plurality of holding portions, the robot teaching device comprising:

a teaching pose measurement unit configured to measure and/or calculate a teaching pose that is a pose of a first held object held by a teacher during teaching work; and a robot operation generation unit configured to generate a joint displacement sequence of the robot such that a pose of a second held object held by the robot becomes the same pose as the teaching pose, wherein the robot operation generation unit is configured to display a countermeasure that is within the movable range and enables avoiding of the interference, and to allow a user to select the countermeasure; and in a case where the calculated joint displacement sequence of the robot exceeds a movable range of the robot, or in a case where it is determined that interference occurs between the robot and a surrounding structure when the robot is driven according to the calculated joint displacement sequence, the robot operation generation unit changes at least one of a position of the second held object, displacement of another joint that is not a driving target when it is determined that the movable range is exceeded or the interference occurs, or a position of a pedestal on which the robot is mounted, while maintaining a relationship of relative positions and relative postures between the holding portions.

2. The robot teaching device according to claim 1, wherein the teaching pose measurement unit measures and/or calculates a trajectory of at least one reference point of the first held object, and the robot operation generation unit generates the joint displacement sequence based on the trajectory of the at least one reference point of the first held object.

3. The robot teaching device according to claim 1, wherein
the teaching pose measurement unit measures and/or calculates the teaching pose in time series, and
the robot operation generation unit generates the joint displacement sequence synchronized with the time series of the teaching pose.
4. The robot teaching device according to claim 1, wherein
the robot operation generation unit measures and/or calculates a pose of a holding portion of the robot by coordinate conversion based on a positional relationship between a held object coordinate system with reference to the first held object and a holding portion coordinate system with reference to the holding portion of the robot.
5. The robot teaching device according to claim 4, wherein
the robot operation generation unit calculates a pose of a link tip of the robot based on the teaching pose by coordinate conversion based on a positional relationship between the holding portion coordinate system with reference to the holding portion of the robot and a link tip coordinate system with reference to a center of a wrist flange of the robot.
6. The robot teaching device according to claim 5, wherein
the robot operation generation unit generates the joint displacement sequence by calculating joint displacement of the robot as a solution of inverse kinematics calculation based on time-series data on the pose of the link tip.
7. The robot teaching device according to claim 1, wherein
the robot operation generation unit changes the position of the second held object by translating a position, where the second held object is to be located, in at least one of forward, backward, leftward, rightward, upward, and downward directions.
8. The robot teaching device according to claim 1, wherein
the robot operation generation unit changes displacement of a waist joint of the robot as the other joint.
9. The robot teaching device according to claim 1, wherein
the robot operation generation unit translates the position of the pedestal, on which the robot is mounted, in any one of forward, backward, leftward, rightward, upward, and downward directions.
10. The robot teaching device according to claim 1, further comprising:
a work scenario editing unit configured to describe a series of work including at least one unit operation as a work scenario based on data generated by the robot operation generation unit; and
a work scenario execution unit configured to sequentially interpret the work scenarios and cause the robot to execute the unit operation.
11. The robot teaching device according to claim 10, wherein
the work scenario editing unit includes a robot unit operation display portion configured to select the unit operation and display the unit operation as a two-dimensional or three-dimensional moving image or a trajectory of a holding portion of the robot, and
a robot state display portion configured to display joint displacement of the robot, a pose of the holding portion of the robot, a position of the pedestal on which the robot is mounted which are displayed by the robot unit operation display portion.
12. The robot teaching device according to claim 11, wherein
in a case where another unit operation is to be added to the series of work, when the pose of the holding portion in the unit operation serving as a connection target does not match a pose of the holding portion in the unit operation to be added, the work scenario editing unit connects these poses by continuously interpolating.
13. The robot teaching device according to claim 12, further comprising:
a display unit configured to display whether there is a mismatch between the pose of the holding portion in the unit operation serving as the connection target and a pose of the holding portion in the unit operation to be added.
14. A work teaching method for teaching work to a robot configured to hold and move a held object with a plurality of holding portions, the work teaching method comprising:
a teaching pose measurement step of measuring and/or calculating a teaching pose that is a pose of a first held object held by a teacher during teaching work;
a holding portion pose calculation step of calculating a pose of a holding portion of the robot that holds a second held object based on data on the pose of the first held object;
a robot operation generation step of searching for a solution of joint displacement that does not cause interference with a surrounding structure within a movable range of the robot and generating a joint displacement sequence executable by the robot by calculating a joint displacement sequence of the robot as a solution of inverse kinematics calculation based on data on the pose of the holding portion, and in a case where joint displacement of the robot exceeds the movable range at that time, or in a case where interference occurs between the robot and the surrounding structure when the robot is driven according to the calculated joint displacement sequence, changing at least one of
a pose to be taken by the second held object,
displacement of another joint that is not a driving target when it is determined that the movable range is exceeded or the interference occurs, or
a position of a pedestal on which the robot is mounted, while maintaining a relationship of relative positions and relative postures between the holding portions;
a work scenario editing step of, treating the joint displacement sequence as a unit operation of the robot for a certain period of time, describing a series of work including at least one unit operation as a work scenario, and in a case of selecting a unit operation of the robot and adding and connecting the selected unit operation as a unit operation continuous with a certain unit operation in the work scenario, when a pose of the holding portion of the robot in the unit operation in the series of work does not match a pose of the holding portion of the robot in the unit operation to be added, generating a joint displacement sequence of the robot for continuously interpolating between these poses without causing interference with the surrounding structure within the movable range of the robot, and inserting the interpolation operation into the work scenario;
a work scenario execution step of sequentially interpreting and executing the work scenarios; and a robot joint axis control step of performing drive control on a joint axis of the robot according to the work scenarios.

15. A robot teaching device for teaching work to a robot configured to hold and move a held object, the robot teaching device comprising:

a teaching pose measurement unit configured to measure and/or calculate a teaching pose that is a pose of a first held object held by a teacher during teaching work;

a robot operation generation unit configured to generate a joint displacement sequence of the robot such that a pose of a second held object held by the robot becomes the same pose as the teaching pose; and a display unit configured to display a trajectory of a holding portion of the robot according to the sequence generated by the robot operation generation unit, wherein the display unit is configured to display a position on the trajectory, the position exceeding a movable range of the robot or causing interference with a surrounding structure, and the robot operation generation unit is configured to display a countermeasure that is within the movable range and enables avoiding of the interference, and to allow a user to select the countermeasure.

\* \* \* \* \*